May 22, 1951  G. BYERLEY ET AL  2,553,893
COMPRESSED FLUID OPERATED ENGINE
Filed June 13, 1947  3 Sheets-Sheet 1

Inventors
Garold Byerley &
James C. King
L. B. James
Attorney

Inventors
Garold Byerley &
James C. King
By L. B. James
Attorney

May 22, 1951     G. BYERLEY ET AL     2,553,893
COMPRESSED FLUID OPERATED ENGINE
Filed June 13, 1947     3 Sheets-Sheet 3
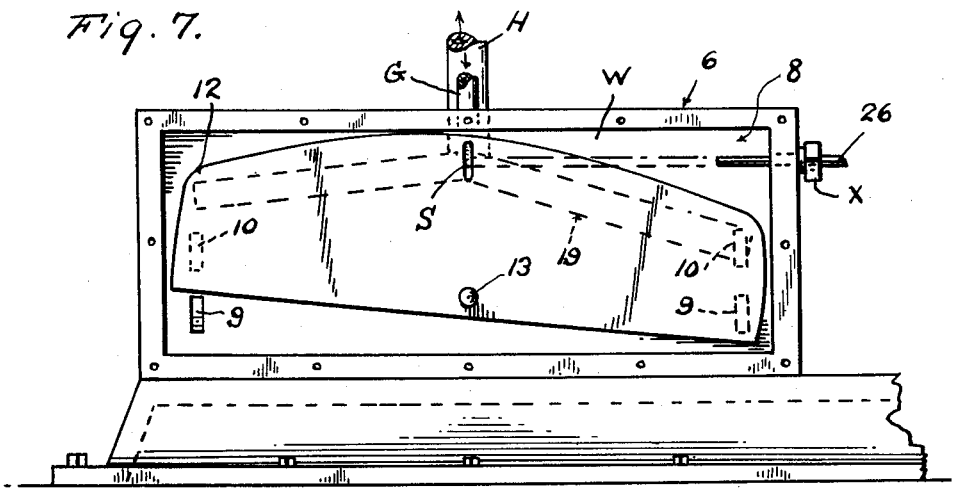
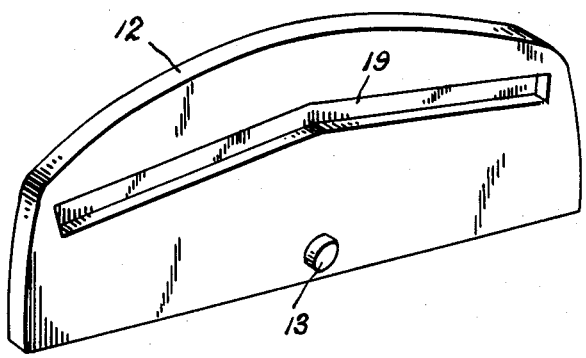
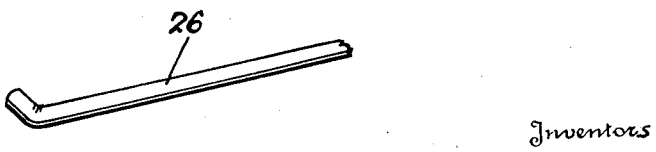
Inventors
Garold Byerly &
James C. King
By L. B. James
Attorney Patented May 22, 1951

2,553,893

UNITED STATES PATENT OFFICE 2,553,893

COMPRESSED FLUID OPERATED ENGINE

Garold Byerley and James C. King,
Redding, Calif.

Application June 13, 1947, Serial No. 754,550

1 Claim. (Cl. 121—180)

This invention relates to power plants and more particularly compressed fluid operated engines.

One of the objects of this invention resides in the provision of a compressed fluid operated engine adapted to produce power from both strokes of its piston.

Another object of this invention resides in the particular construction of the valve.

A further object of this invention resides in the particular construction of the cylinder and compressed fluid chamber formed thereon.

A still further object of this invention resides in the particular manner of disposing the valve in the air chamber.

Aside from the aforesaid objects, this invention resides in the particular means for retaining the valve in operative position relative to the inlet and exhaust ports of the cylinder.

In addition to the foregoing objects this invention resides in the particular construction and assemblage of the valve operating means.

One of the salient features of this invention resides in the particular construction of the piston.

With these and other objects in view, this invention resides in certain novel features of construction and arrangement of elements to be hereinafter more particularly set forth in the specification, illustrated in the accompanying drawings and pointed out in the appended claim and, while this disclosure depicts our present conception of the invention, the right is reserved to resort to such changes in construction and arrangement of elements as come within the spirit of the invention.

In the accompanying drawings forming a part of this invention;

Fig. 7 is an inner side view of the valve.

Figures 8 and 9 are perspective views of the valve and push-rod, respectively.

Figure 1:
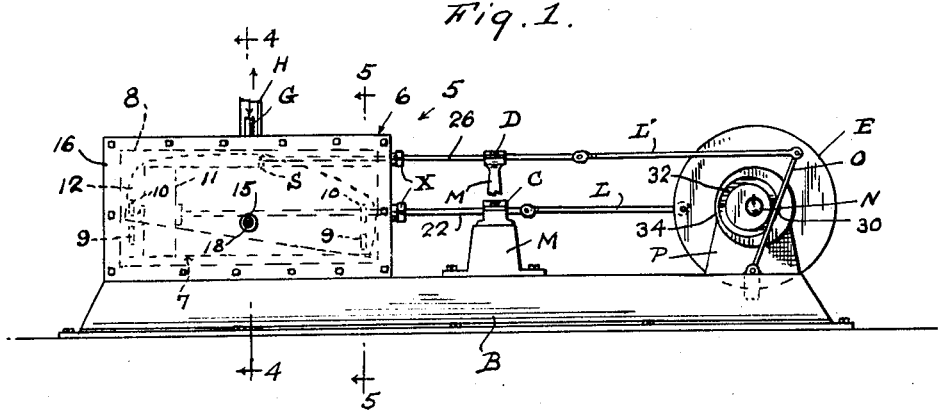
Fig. 1 is a side view of the engine.
Figure 2:
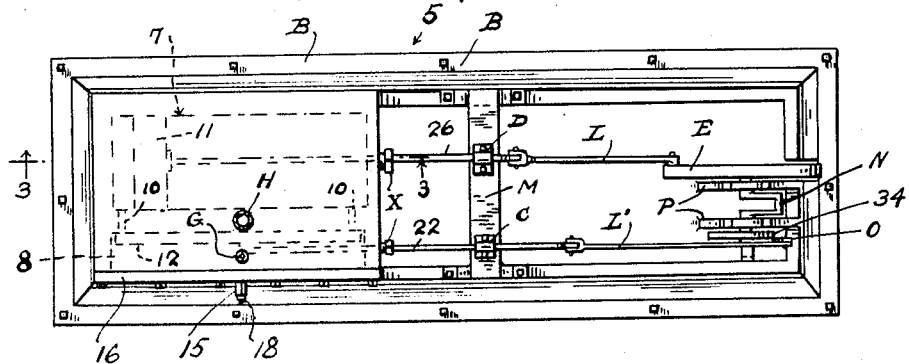
Fig. 2 is a plan view thereof.
Figure 3:
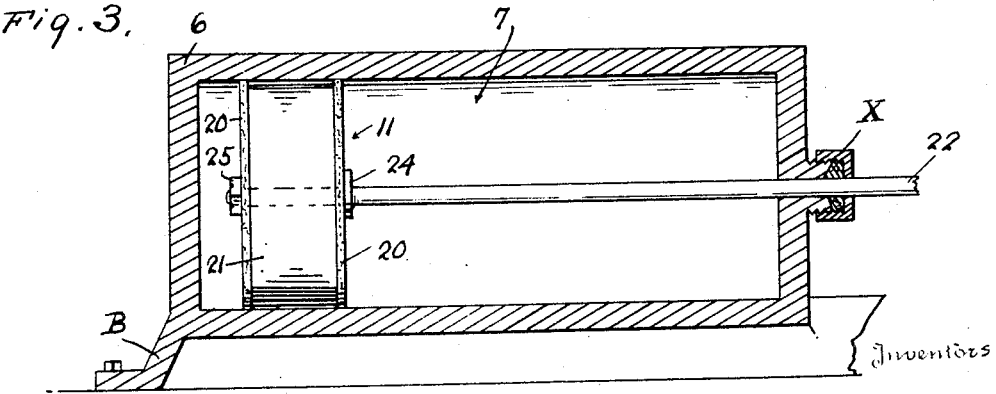
Fig. 3 is a longitudinal sectional view thereof taken approximately on line 3—3 of Fig. 2.
Figure 4:
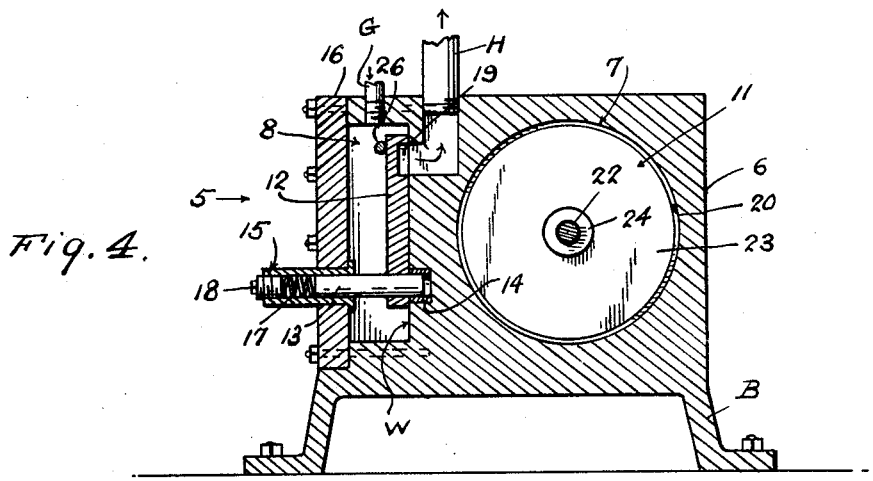
Fig. 4 is a cross sectional view taken approximately on line 4—4 of Fig. 1.
Figure 5:
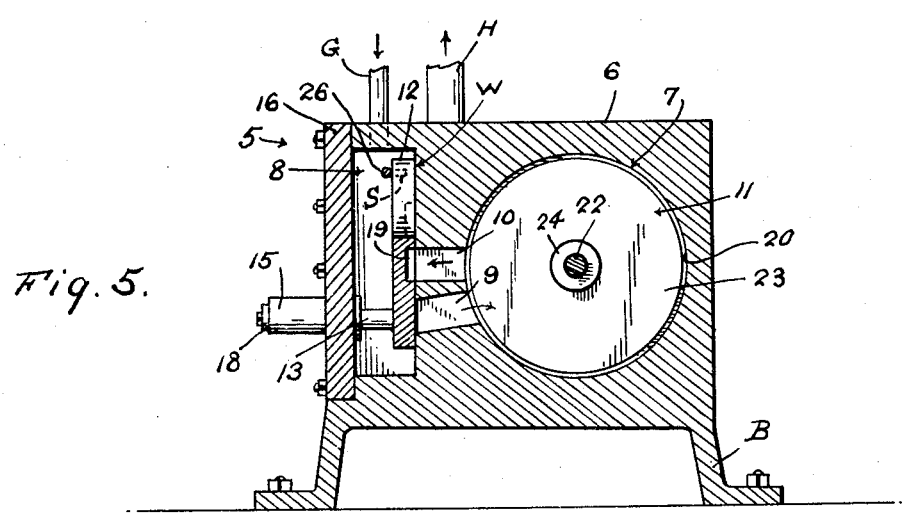
Fig. 5 is a side view of a portion of the engine with the cap plate of the compressed fluid chamber removed.
Figure 6:
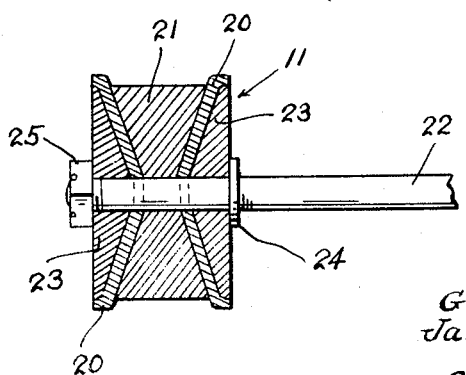
Fig. 6 is a cross sectional view through the engine taken approximately on line 6—6 of Fig. 1.

In the present illustration of this invention, the numeral 5 indicates, in general, a compressed fluid operated engine consisting of a block 6 of any approved configuration having a cylinder 7 formed therein communicating with an elongated compressed fluid chamber 8 through inlet and exhaust ports 9 and 10 preferably located adjacent opposite ends of the cylinder to permit compressed fluid to alternately enter the cylinder behind opposite sides of a piston 11 at the limits of its strokes and likewise permit exhaustion in advance of the piston during the power strokes thereof.

Rockably disposed within the compressed fluid chamber and bearing against the outer wall W of the cylinder and over the aforesaid ports therein is a valve 12 in the form of a plate having its upper corners sheared off or rounded so as to permit it to rock within the fluid chamber on a trunnion 13 extending through the valve and secured thereto with opposite ends journalled in bushings 14 and 15 seated in the cylinder and a cover plate 16 removably secured over the compressed fluid chamber.

The valve is frictionally retained against the wall W through the instrumentality of an expansion coil spring 17 disposed in the bushing 15 and tensioned by a jam nut 18 screwed in the outer end of said bushing thereagainst and, through the provision of said means for rockably supporting the valve, leakage of compressed fluid thereby will be prevented and smooth operation thereof against the wall W is permitted.

Formed in the inner side of the valve is an elongated groove 19 adapted to alternately register with opposite exhaust ports so as to permit spent compressed fluid in the cylinder to be forced out by the advancing piston to an exhaust conduit leading to the exterior of the cylinder.

The piston is constructed of substantially cup-shape washers 20 formed of leather or other suitable material separated by a similar shaped disk 21 and retained on the piston rod 22 by substantially conical washers 23 which are compressed toward a collar 24 on the piston rod by a nut 25 to cause the leather washers to obtain leak-proof contact with the cylinder wall and yet permit smooth operation of the piston therein.

The cylinder is mounted or otherwise connected to a base B which is provided with pillars M and P, the former of which supports guide bearings C and D for slidably receiving the outer portions of the piston and a push-rod 26 connected to the valve which extends through packing glands X on the end of the cylinder. Said push-rod has its inner end disposed in a slot S in the valve to permit it to rock on its trunnion without binding.

Journalled on the pillar P of the base is a crank-shaft N carrying a flywheel E to which is eccentrically connected the outer end of a link L having its inner end connected to the piston rod so as to cause the piston to travel a predetermined distance within the cylinder.

Mounted on the base adjacent the aforesaid crankshaft is a rocker-arm O having its upper end pivotally connected to the push-rod and its medial portion provided with a roller 30 or the like seated in an eccentric groove 32 formed in a disk 34 splined or otherwise formed on the crank-shaft thus causing the rocker-arm to reciprocate the push-rod and alternately open and close opposite inlet and exhaust ports through the instrumentality of the valve.

Communicating with the compressed fluid chamber is an intake conduit G connected to an air pressure tank (not shown) and in order to discharge spent compressed fluid from the cylinder, an exhaust conduit H communicates therewith.

With this invention fully set forth, it is manifest that a compressed air engine is provided which is simple in construction and efficient in operation and through the particular assemblage of the valve mechanism, maximum power is produced with minimum fluid pressure.

Having thus described our invention what we claim and desire to protect by Letters Patent is:

In a compressed fluid operated engine comprising, a cylinder in communication with a compressed fluid chamber formed on one side thereof through adjacent inlet and exhaust ports disposed at opposite ends thereof, a cover removably secured over the outer side of said compressed fluid chamber, and elongated bushing secured to and extending outwardly through a hole in the lower central portion of the cover, a bushing seated in the cylinder in axial alignment with the first mentioned bushing, a valve disposed in the compressed fluid chamber over said ports, a trunnion secured to the valve with its opposite ends extending into the aforesaid bushings, an expansion coil spring disposed in the elongated bushing with its inner end bearing against the outer end of said trunnion, a jam nut screwed in the outer end of the elongated bushing with its inner end bearing against the outer end of said coil spring, means rocking said valve to alternately open and close the inlet and exhaust ports, a piston in the cylinder, a piston rod connected to the piston, means connected to the piston rod to synchronize operation thereof in opening and closing of the inlet and exhaust ports by the valve, an inlet conduit connecting the compressed fluid chamber to a source of compressed fluid, and an exhaust conduit leading from the cylinder to the exterior thereof.

GAROLD BYERLEY.
JAMES C. KING.

REFERENCES CITED

The following references are of record in the file of this patent:

UNITED STATES PATENTS

| Number | Name | Date |
| --- | --- | --- |
| 56,120 | Stuart | July 3, 1866 |
| 193,440 | Davies et al. | July 24, 1877 |
| 728,787 | Wackerow | May 19, 1903 |
| 908,478 | Miller | Jan. 5, 1909 |
| 2,422,758 | Temple | June 24, 1947 |